US012613159B2

(12) United States Patent
Eun et al.

(10) Patent No.: US 12,613,159 B2
(45) Date of Patent: Apr. 28, 2026

(54) VIBRATION CONTROL METHOD FOR ARTIFICIAL SATELLITE VIBRATION TEST

(71) Applicant: KOREA AEROSPACE RESEARCH INSTITUTE, Daejeon (KR)

(72) Inventors: Hee-Kwang Eun, Sejong-si (KR); Jong-Min Im, Daejeon (KR); Jong-Hyub Jun, Daejeon (KR); Sung-Hyun Woo, Daejeon (KR); Chang-Rae Cho, Daejeon (KR); Nam-Jin Moon, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 622 days.

(21) Appl. No.: 18/051,683

(22) Filed: Nov. 1, 2022

(65) Prior Publication Data

US 2023/0140243 A1 May 4, 2023

(30) Foreign Application Priority Data

Nov. 2, 2021 (KR) ........................ 10-2021-0149105

(51) Int. Cl.
G01M 7/02 (2006.01)
(52) U.S. Cl.
CPC ................................... G01M 7/022 (2013.01)
(58) Field of Classification Search
CPC .......... G01M 7/00; G01M 7/02; G01M 7/022; G01M 7/025; G01M 7/06; G01M 5/0066; G01H 1/00; B64G 1/10
See application file for complete search history.

(56) References Cited

U.S. PATENT DOCUMENTS

| | | | |
|---|---|---|---|
| 7,051,593 B2 | 5/2006 | Fletcher | |
| 2002/0072811 A1* | 6/2002 | Merchant | G05B 17/02 |
| | | | 700/275 |
| 2020/0232874 A1* | 7/2020 | Underwood | G01M 7/022 |

FOREIGN PATENT DOCUMENTS

| | | |
|---|---|---|
| JP | 2001133357 | 5/2001 |
| JP | 4965816 | 7/2012 |
| JP | 2022517825 | 3/2022 |
| KR | 1020210082971 | 7/2021 |

* cited by examiner

*Primary Examiner* — Andrew Schechter
*Assistant Examiner* — Matthew W. Baca
(74) *Attorney, Agent, or Firm* — Perman & Green, LLP

(57) ABSTRACT

Provided is a method of controlling vibration in an artificial satellite vibration test by using a controller and a plurality of shakers installed on an artificial satellite and configured to vibrate at a predetermined frequency. The method includes: performing a pre-test operation in which the controller sets the artificial satellite as a system and calculates a plurality of input values using a frequency response function of the system and an inverse matrix of the frequency response function; determining, by the controller, whether errors, which are differences between target values and a plurality of output values resulting from the plurality of input values, are within a first range; and performing, by the controller depending on results of the determination, single shaker control using one of the plurality of shakers, or multiple shaker control using the plurality of shakers.

4 Claims, 3 Drawing Sheets

VIBRATION CONTROL METHOD FOR ARTIFICIAL SATELLITE VIBRATION TEST

CROSS-REFERENCE TO RELATED APPLICATION

This application is based on and claims priority under 35 U.S.C. § 119 to Korean Patent Application No. 10-2021-0149105, filed on Nov. 2, 2021, in the Korean Intellectual Property Office, the disclosure of which is incorporated by reference herein in its entirety.

BACKGROUND

1. Field

The present disclosure relates to a vibration control method, and more particularly, to a vibration control method for an artificial satellite vibration test.

2. Description of the Related Art

When launch vehicles carrying artificial satellites are launched into outer space, the launch vehicles are exposed to high-temperature and high-pressure environments and undergo extreme structural vibration. Such vibration may cause damage to launch vehicles and artificial satellites loaded on the launch vehicles. To address this, the effect of vibration on artificial satellites during launch may be verified in advance by conducting an artificial satellite vibration test on the ground. For example, a vibration test is performed in a horizontal launch environment by placing a payload on a slip table and vibrating the slip table using a shaker.

In general, a vibration test is performed by installing one shaker on a slip table. In this case, the vibration test is performed assuming that the slip table is a rigid body, but the slip table cannot be treated as a rigid body in a high frequency region. In addition, a plurality of responses may not be controlled using only one shaker. Furthermore, in such a vibration test system, the absolute values of responses are used as a control parameter, and thus two completely different responses may have the same absolute value.

Moreover, in a vibration test method of the related art called a multiple input/output control method, inputs (for example, accelerations) are generated using a plurality of shakers, and resultant outputs (for example, vibration responses of a payload) are feedback controlled. In this method, however, as the number of shakers increases, the number of inputs and the number of resultant outputs increase, thereby requiring a complicated determinant and inevitably making a system sensitive to error.

Those described above are technical information that the inventors had for deriving the inventive concept or acquired while deriving the inventive concept, and may not be known to the public prior to the filling of the present application.

PRIOR ART DOCUMENTS

Patent Documents (Patent Document 1) Japanese Patent No. JP 4965816 B2

SUMMARY

Provided is a vibration control method for an artificial satellite vibration test, wherein errors are reduced by selectively performing single shaker control or multiple shaker control according to frequency bands.

For example, embodiments are provided to improve the stability of multiple input/output control methods of the related art in single-axial lateral random vibration tests.

Embodiments set forth herein are examples, and embodiments of the present disclosure are not limited thereto.

Additional aspects will be set forth in part in the description which follows and, in part, will be apparent from the description, or may be learned by practice of the presented embodiments of the disclosure.

According to an aspect of the present disclosure, there is provided a method of controlling vibration in an artificial satellite vibration test by using a controller and a plurality of shakers installed on an artificial satellite and configured to vibrate at a predetermined frequency, the method including: performing a pre-test operation in which the controller sets the artificial satellite as a system and calculates a plurality of input values using a frequency response function of the system and an inverse matrix of the frequency response function; determining, by the controller, whether errors, which are differences between target values and a plurality of output values resulting from the plurality of input values, are within a first range; and performing, by the controller depending on results of the determination, single shaker control using one of the plurality of shakers, or multiple shaker control using the plurality of shakers.

According to some embodiments, in the method, the determining of whether the errors are within the first range may include calculating errors at predetermined frequency intervals in an entire frequency band by using one of the plurality of shakers.

According to some embodiments, in the method, when the errors are within the first range, the controller may perform the single shaker control using one of the plurality of shakers.

According to some embodiments, in the method, when the errors are outside the first range, the controller may perform the multiple shaker control using the plurality of shakers.

According to some embodiments, in the method, before performing the multiple shaker control, the controller may reduce a dimension of the frequency response function by calculating errors for combinations of the plurality of output values per predetermined frequency interval and selecting one of the combinations resulting in a minimum error.

According to some embodiments, in the method, the plurality of input values may be two in number and the plurality of output values may be three or four in number, and the controller may reduce the dimension of the frequency response function by selecting three combinations of the plurality of output values per predetermined frequency interval, calculating an error for each of the combinations, and selecting one of the combinations resulting in a minimum error such that the frequency response function may have two input values and two output values.

Other aspects, features, and advantages will become apparent and more readily appreciated from the accompanying drawings, claims, and detailed description.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
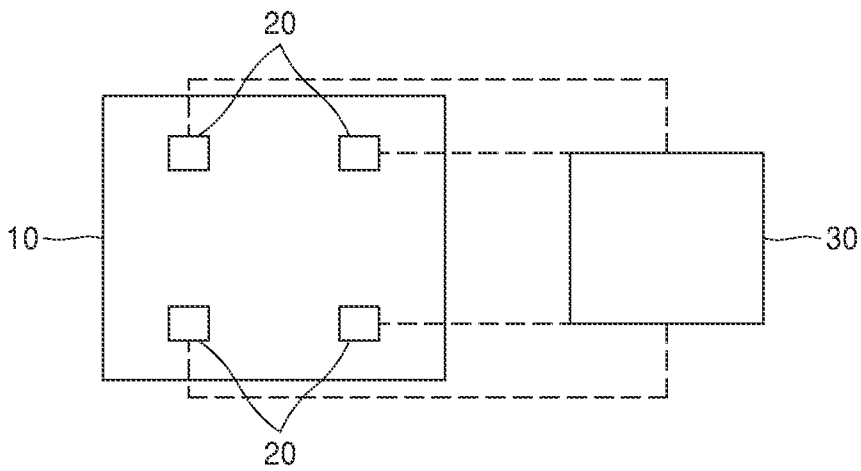
FIG. 1 is a view illustrating a vibration control device according to an embodiment.

Reference will now be made in detail to embodiments, examples of which are illustrated in the accompanying drawings, wherein like reference numerals refer to like elements throughout. In this regard, the embodiments may have different forms and should not be construed as being limited to the descriptions set forth herein. Accordingly, the embodiments are merely described below, by referring to the figures, to explain aspects of the description. As used herein, the term "and/or" includes any and all combinations of one or more of the associated listed items. Expressions such as "at least one of," when preceding a list of elements, modify the entire list of elements and do not modify the individual elements of the list.

The present disclosure may have various different forms and various embodiments, and specific embodiments are described with reference to the accompanying drawings. However, the present disclosure is not limited to the specific embodiments, and it should be understood that the idea and technical scope of the embodiments cover all the modifications, equivalents, and replacements. In the descriptions of embodiments, like reference numerals denote like elements.

Hereinafter, embodiments will be described with reference to the accompanying drawings. In the drawings, like reference numerals denote like elements, and overlapping descriptions thereof will be omitted.

In the following descriptions of the embodiments, although terms such as "first" and "second" are used to describe various elements, these elements should not be limited by these terms. These terms are only used to distinguish one element from another element.

The terms of a singular form may include plural forms unless otherwise mentioned.

It will be further understood that the terms "comprises" and/or "comprising" used herein specify the presence of stated features or elements, but do not preclude the presence or addition of one or more other features or elements.

Sizes of elements in the drawings may be exaggerated for ease of explanation. In other words, sizes and thicknesses of elements in the drawings are arbitrarily illustrated for ease of explanation, and thus the following embodiments are not limited thereto.

In the following embodiments, the x-axis, the y-axis and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

When a certain embodiment is implemented differently, a specific process order may be performed differently from the described order. For example, two consecutively described processes may be performed substantially at the same time or performed in an order opposite to the described order.

In the following description, the technical terms are used only for explaining a specific embodiment while not limiting the present disclosure. The term "include" or "comprise" used herein specifies the presence of a property, a fixed number, a step, a process, an element, a component, and a combination thereof, but does not exclude the presence or addition of other properties, fixed numbers, steps, processes, elements, components, and combinations thereof.

In an embodiment, an input/output vibration control device 1 (hereinafter also referred to as a "vibration control device 1") for an artificial satellite may be used in equipment for testing the vibration stability of an artificial satellite to be mounted on a launch rocket. For example, the inventive concept may be used for a single-axial lateral random vibration test in which a payload such as an artificial satellite, a part of an artificial satellite, or a launch rocket engine is mounted on a slip table and is vibrated in one direction using shakers.

Referring to FIG. 1, according to an embodiment, the input/output vibration control device 1 may include an artificial satellite 10, shakers 20, and a controller 30.

The type of the artificial satellite 10 is not limited, and may be any one of various types of artificial satellites such as communication satellites, broadcasting satellites, weather satellites, scientific satellites, navigation satellites, earth observation satellites, technology development satellites, and military satellites. The artificial satellite 10 may be launched in a state in which the artificial satellite 10 is mounted on a launch vehicle such as a rocket.

The shakers 20 are attached to one side of the artificial satellite 10 and configured to vibrate the artificial satellite 10 at a predetermined frequency. One or more shakers 20 may be arranged inside and/or outside the artificial satellite 10. In an embodiment, the shakers 20 may be electronic shakers. For example, the controller 30 may send a control signal to the shakers 20 by wired or wireless communication, and then the shakers 20 may generate vibration corresponding to the control signal. In an embodiment, the vibration control device 1 may be a dual shaker system including two shakers 20.

In an embodiment, each of the shakers 20 may include a vibration generator, an amplifier, and an accelerometer. A control signal transmitted from the controller 30 may be amplified by the amplifier and may then be transmitted to the vibration generator. When the vibration generator vibrates the artificial satellite 10, the accelerometer may display an acceleration value as an output value corresponding to the vibration and may transmit the output value back to the controller 30.

That is, according to an embodiment, in the input/output vibration control device 1, an input value may be a control signal of the controller 30, and an output value may be vibration information (for example, acceleration).

The controller 30 is configured to control a vibration test, which is performed using the input/output vibration control device 1. For example, the controller 30 may transmit a control signal to a plurality of shakers 20 to vibrate the artificial satellite 10. In addition, the controller 30 may determine the artificial satellite 10 as a system to be tested and may calculate a frequency response function of the system (a characteristic function of the system) and the inverse matrix of the frequency response function to obtain an input value, that is, a control signal for obtaining a target value. Then, the controller 30 may transmit the control signal to the shakers 20. In addition, the controller 30 may calculate an error from the target value by controlling the shakers 20 through the control signal corresponding to the input value and receiving an output value. In addition, when the error is within a first range that is previously set, the controller 30 may performs single shaker control (single feedback control) by controlling only one of the shakers 20, and when the error is outside the first range, the controller 30 may perform multiple shaker control (multiple feedback control) by controlling a plurality of shakers 20. In single shaker control, the artificial satellite 10 is excited, that is, vibrated using only one shaker 20, and in multiple shaker control, the artificial satellite 10 is excited using a plurality of shakers 20. Furthermore, in multiple shaker control, two shakers 20 may be operated in different frequency regions. That is, one shaker 20 may be operated only in a low frequency region, and the other shaker 20 may be operated in the entire frequency region.

To this end, the controller 30 may include: a communication module for data communication with other components of the vibration control device 1 such as the artificial satellite 10 and the shakers 20, and external devices; a calculation module configured to calculate system characteristics, input values, and errors to perform feedback control; and a control module configured to generate control signals to be transmitted to the artificial satellite 10, the shakers 20, external devices, or the like. In addition, the controller 30 may further include a well-known component necessary for vibration control tests, such as a display module configured to visually display a vibration test state or an input module configured to receive instructions from users.

Next, a method of controlling vibration using the vibration control device 1 will be described according to embodiments with reference to FIGS. 1 to 3.

First, referring to FIG. 1, the shakers 20 are connected to the artificial satellite 10 and the controller 30. The number of shakers 20 is not limited, and may be one or more. Hereinafter, for ease of illustration, the case in which two shakers 20 are attached to the artificial satellite 10 will be mainly described. In addition, each of the shakers 20 may have one or more response points. For example, each of the shakers 20 may have one response point or two response points.

Next, the controller 30 performs a pre-test operation. In the pre-test operation, the controller 30 may perform operations such as an operation of calculating characteristics of a system (the artificial satellite 10 in the present disclosure) to be subjected to a vibration test and an operation of determining a control signal to be generated, that is, an input value to be generated, to determine preliminary conditions for controlling the shakers 20.

In an embodiment, the controller 30 may acquire characteristics of the system in the pre-test operation. For example, the controller 30 may acquire a characteristic equation representing response characteristics of the system to obtain a characteristic function of the system.

For example, characteristics of the system in a vibration test may be calculated as follows. First, when it is assumed that the system is a linear system, the system may be represented by an equation: output value Y=system H*input value X. The equation may be expressed as the following multiple input/output form in which the scale of output values are linear with input values.

$$X_y = HX_x$$

Here, $X_x$ refers to a linear spectrum of input values, $X_y$ refers to a linear spectrum of output values, and H refers to a system characteristic matrix, that is, a frequency response matrix. For example, H may refer to a frequency response function expressing responses with respect to a driving signal of the shakers 20. For example, the controller 30 may calculate H by defining a spectrum in a frequency domain by using a Fourier transform as shown below.

$$H(f) = \int_{-\infty}^{\infty} h(t)e^{-i2\pi ft} dt$$

Here, an input value is a driving signal (vibration signal) provided to the amplifiers of the shakers 20. In addition, h refers to a driving signal of the shakers 20. In addition, the sizes of $X_x$, $X_y$, and H are N*1, M*1, and M*N, respectively.

In an embodiment, the number of input values (driving signals) and the number of output values (responses) in the vibration control device 1 may be equal to each other or different from each other. For example, the number of output values may be equal to or greater than the number of input values.

For example, when the number of input values is 2 and the number of output values is 2, $X_y$, H, and $X_x$ may be expressed as follows.

$$X_y = \left\{ \begin{array}{c} y_1 \\ y_2 \end{array} \right\}, X_x = \left\{ \begin{array}{c} x_1 \\ x_2 \end{array} \right\}, H = \left[ \begin{array}{cc} H_{11} & H_{12} \\ H_{21} & H_{22} \end{array} \right]$$

In addition, $X_y = HX_x$ may be expressed as a power form in a linear space as follows.

$$S_{yy} = HS_{xx}H'$$

$$\left\{ \begin{array}{c} S_{Y1} \\ S_{Y2} \end{array} \right\} = \left[ \begin{array}{cc} H_{11} & H_{12} \\ H_{21} & H_{22} \end{array} \right] * \left\{ \begin{array}{c} S_{X1} \\ S_{X2} \end{array} \right\} = \left\{ \begin{array}{c} T_1 \\ T_2 \end{array} \right\}$$

Here, $S_{xx}$ and $S_{yy}$ refer to spectral density matrices respectively indicating input values (for example, voltages) and output values (for example, accelerations). In addition, H refers to a transmissibility response function (TRF), and H' refers to the conjugate transpose of H. In addition, T refers to target values.

Here, H is an already known function or a characteristic function of the system calculated by the controller 30, and input values $S_{xx}$ may be calculated by inputting target values to $S_{yy}$.

For example, the inverse matrix G of H, that is, the Moore-Penrose inverse matrix of H, is calculated. Then, $S_{xx}$ may be calculated by matrix operation as follows.

$$S_{xx} = GS_{YY}G'$$

As mentioned above, $S_{yy}$ in the equation above refers to intended target values, and may be expressed as $S_{TT}$. $S_{TT}$ may be as follows.

$$S_{TT} = \left[ \begin{array}{cc} S_{T1T1} & S_{T1T2} \\ S_{T2T1} & S_{T2T2} \end{array} \right]$$

In addition, an error may be expressed as follows.

$$\|E(f)\|^2 = \|S_{TT}(f) - H(f)S_{XX}(f)H(f)'\|^2$$

Here, E(f) refers to an error, which is the difference between target values and output values, $S_{TT}(f)$ refers to target values, $S_{TT}(f)$ refers to a system characteristic matrix, $S_{XX}(f)$ refers to input values, and H(f)' refers to the conjugate transpose of the system characteristic matrix.

In addition, when both the number of input values and the number of output values are 2, the vibration control device 1 (multiple input/output control system) may be assumed as a rigid body. In this case, $S_{Y1}$ and $S_{Y2}$ may be set to be equal to each other, and $S_{T1T1} = S_{T1T2} = S_{T2T1} = S_{T2T2} = a_T^2$ is satisfied. Here, $a_T^2$ refers to the target magnitude of Str. In addition, error E(f)=0 is satisfied.

In addition, when the number of input values is 2 and the number of output values (that is, the number of response points) is 4, $X_y$, H, and $H_x$ may be expressed as follows.

$$X_y = \begin{Bmatrix} y_1 \\ y_2 \\ y_3 \\ y_4 \end{Bmatrix}, X_x = \begin{Bmatrix} x_1 \\ x_2 \end{Bmatrix}, H = \begin{bmatrix} H_{11} & H_{12} \\ H_{21} & H_{22} \\ H_{31} & H_{32} \\ H_{41} & H_{42} \end{bmatrix}$$

In addition, $X_y = HX_x$ may be expressed as a power form in a linear space as follows.

$$S_{yy} = HS_{xx}H'$$

$$\begin{Bmatrix} S_{Y1} \\ S_{Y2} \\ S_{Y3} \\ S_{Y4} \end{Bmatrix} = \begin{bmatrix} H_{11} & H_{12} \\ H_{21} & H_{22} \\ H_{31} & H_{32} \\ H_{41} & H_{42} \end{bmatrix} * \begin{Bmatrix} S_{X1} \\ S_{X2} \end{Bmatrix} = \begin{Bmatrix} T_1 \\ T_2 \\ T_3 \\ T_4 \end{Bmatrix}$$

Here, $S_{xx}$ and $S_{yy}$ refer to spectral density matrices respectively indicating input values (for example, voltages) and output values (for example, accelerations). In addition, H refers to a transmissibility response function (TRF), and H' refers to the conjugate transpose of H. In addition, T refers to target values.

Here, H is an already known function or a characteristic function of the system calculated by the controller 30, and input values $S_{xx}$ may be calculated by inputting target values to $S_{yy}$.

For example, the inverse matrix G of H, that is, the Moore-Penrose inverse matrix of H, is calculated. Then, $S_{xx}$ may be calculated by matrix operation as follows.

$$S_{xx} = GS_{YY}G'$$

As mentioned above, $S_{yy}$ in the equation above refers to intended target values, and may be expressed as $S_{TT}$. $S_{TT}$ may be as follows.

$$S_{TT} = \begin{bmatrix} S_{T1T1} & S_{T1T2} & S_{T1T3} & S_{T1T4} \\ S_{T2T1} & S_{T2T2} & S_{T2T3} & S_{T2T4} \\ S_{T3T1} & S_{T3T2} & S_{T3T3} & S_{T3T4} \\ S_{T4T1} & S_{T4T2} & S_{T4T3} & S_{T4T4} \end{bmatrix}$$

That is, according to an embodiment, in the pre-test operation, the controller 30 of the vibration control device 1 (multiple input/output control system) may set the artificial satellite 10 as a vibration system and may calculate a frequency response function of the vibration system and input values.

In addition, when the number of output values is 4 and the number of input values is 2, the vibration control device 1 may not be assumed as a rigid body, and thus error $\|E(f)\|^2 = \|S_{TT}(f) - H(f)S_{XX}(f)H(f)'\|^2$ is not zero. As the singular values of H approach 0 (that is, the frequency band lowers), a variation range of H increases, and thus error, that is, noise, increases.

To address this, according to an embodiment, error may be reduced by lowering the dimension of a matrix using a vector average of combination. This will be described later.

In the pre-test operation, the controller 30 calculates errors based on calculated input values. For example, the controller 30 inputs calculated input values to the frequency response function H to calculate output values, and then calculates, as errors, the differences between preset target values and the output values.

In an embodiment, the controller 30 may calculate an error using one shaker 20 in the pre-test operation. For example, when only one shaker 20 is used, $x_2$ is zero in $$X_x = \begin{Bmatrix} x_1 \\ x_2 \end{Bmatrix}, \text{ obtaining } X_x = \begin{Bmatrix} x_1 \\ 0 \end{Bmatrix}. \text{ Therefore,}$$

$$Y = H_s x_1, \text{ and } S_T = \begin{Bmatrix} S_{Y1} \\ S_{Y2} \\ S_{Y3} \\ S_{Y4} \end{Bmatrix}, S_{Yi} = \sqrt{S_{YiYi}},$$

and $$H_S = \text{abs} \begin{bmatrix} H_{11} \\ H_{21} \\ H_{31} \\ H_{41} \end{bmatrix}.$$

Here, $H_s$ refers to a system characteristic matrix when only one shake 20 is controlled. In addition, an input value $x_1 = \text{sum}(S_T/\text{abs}(H_s))$, and an error, which is the difference between output values and target values, may be expressed as follows.

$$\|E_S(f)\|^2 = \|S_{TT}(f) - S_{YY}(f)\|^2$$

Next, the controller 30 determines whether the error is within a preset range. For example, the controller 30 may determine whether the error, that is, the difference between output values and preset target values, is outside a preset first range. Here, the error may have a negative or positive value. In an embodiment, the first range may be about ±10% of the target values.

As described above, according to an embodiment, the vibration control device 1 may calculate an error by assuming a situation in which only one shaker 20 is controlled, and may determine that the error is within a first range.

According to an embodiment, in the entire frequency band, the controller 30 may determine whether errors are within a preset first range. That is, in a vibration test, the controller 30 may calculate input values in a frequency band from a lower limit to an upper limit, and may determine that resulting errors are within the first range. This determination may be performed on all calculated input values, from a minimum input value to a maximum input value. For example, the controller 30 may determine, at frequency intervals of $\Delta f$ in the entire frequency band, whether errors are within the first range. Here, the entire frequency band may range from about 18.75 Hz to about 2000 Hz, and $\Delta f$ may be about 0.78125 Hz.

In an embodiment, the controller 30 may determine, at intervals of about 0.78125 Hz in the frequency band of about 18.75 Hz to about 2000 Hz, whether errors are within the range of about ±10% of target values.

Next, when the calculated errors are within the first range, the controller 30 performs feedback control using the shaker 20. Conversely, when the calculated errors are outside the first range, the controller 30 performs feedback control using a plurality of shakers 20.

Figure 2:
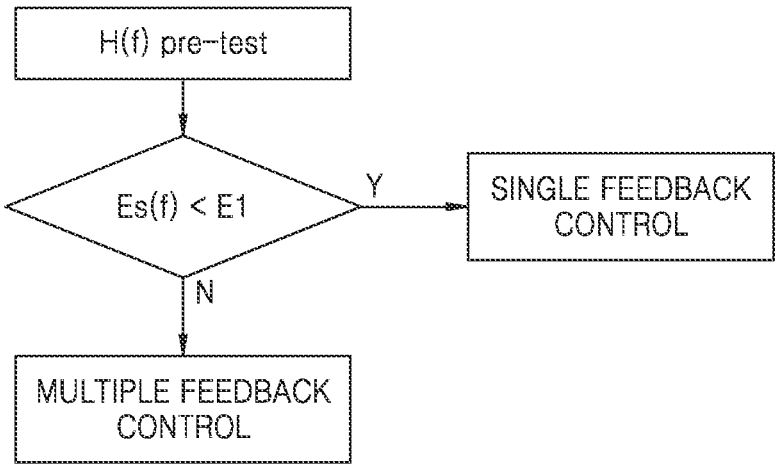
FIGS. 2 and 3 are flowcharts illustrating a vibration control method according to embodiments.
Figure 3:
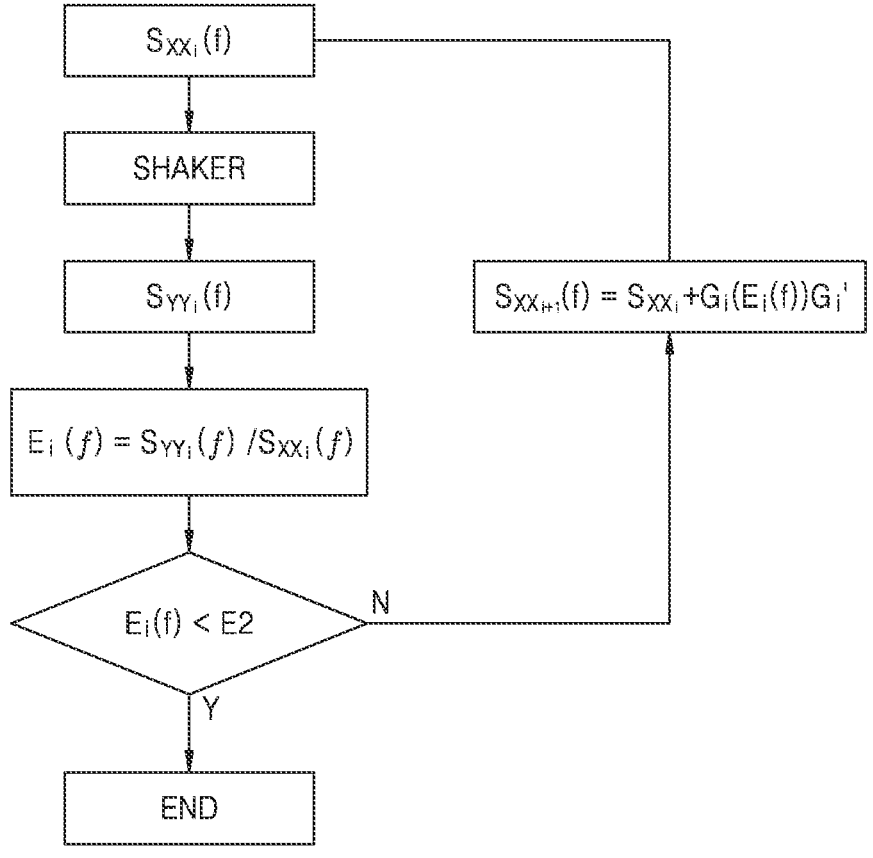

That is, in an embodiment, as shown in FIG. 2, the vibration control device 1 may determine, using one shaker 20, whether errors $E_S(f) = S_{TT}(f) - S_{YY}(f)$, which result from input values, are within the first range, and may select single shaker control or multiple shaker control depending on results of the determination. Accordingly, single shaker control may be performed in a frequency band in which errors are not large, thereby reducing the amount of calculation and time necessary for feedback control. In addition, multiple shaker control may be performed in a frequency band in which errors are large, thereby improving the accuracy of control.

Here, a low frequency band may be defined such that the low frequency band ranges from the lower limit of the entire frequency band to the upper limit of a frequency band in which errors are within the first range; and a high frequency band may be defined such that errors exceed the first range in the high frequency band. In other words, the controller 30 may perform single shaker control in the low frequency band, and multiple shaker control in the high frequency band.

In an embodiment, a frequency band in which single shaker control is performed may be lower than a frequency band in which multiple shaker control is performed. For example, when multiple shaker control is performed in a low frequency band, errors increase during the calculation of an inverse matrix G. According to embodiments, however, the vibration control device 1 performs single shaker control in a low frequency band, thereby reducing such errors.

In an embodiment, during single shaker control, the controller 30 inputs a calculated input value to one shaker 20. Then, the shaker 20 vibrates the artificial satellite 10 at a frequency corresponding to the input value, and information on the vibration of the artificial satellite 10 is transmitted to the controller 30.

Next, the controller 30 determines whether an error, which is the difference between an output value and an input value, is within a preset second range. When the error is within the second range, feedback control is terminated, and when the error is outside the second range, the input value is corrected and input to the shaker 20 again. Here, the error is $S_{TT}(f)-S_{YY}(f)$, which occurs during control using one shaker 20 as described above.

In an embodiment, the second range may be the same as or different from the first range, and for example, the second range may be wider than the first range. That is, according to an embodiment, the second range based on which the vibration control device 1 determines whether to perform feedback control may be wider than the first range based on which the vibration control device 1 determines whether to perform single shaker control or multiple shake control. In an embodiment, the second range may be about ±10%, about ±20%, or about ±30% of a target value.

Conversely, when the error is outside the first range, the controller 30 performs multiple shaker control using a plurality of shakers 20. For example, the controller 30 may perform multiple shaker control in a dual shaker mode using two shakers 20. Here, before performing the multiple shaker control, the controller 30 may reduce the dimension of the frequency response function by calculating errors for combinations of a plurality of output values obtained at predetermined frequency intervals, and selecting a combination resulting in the smallest error.

For example, the controller 30 may group output values such that the number of input values (driving signals) and the number of output values (responses) are equal to each other. For example, when the system has two input values and four output values, the number of possible combinations for four output values is three. For example, when there are four response points, the number of possible combinations of four response points is three (response points 1 and 2, and response points 3 and 4; response points 1 and 3, and response points 2 and 4; and response points 1 and 4, and response points 2 and 3). This may be expressed by the following equations.

$$\bar{S}_{Y1} = (S_{Y1} + S_{Y2})/2, \bar{S}_{Y2} = (S_{Y3} + S_{Y4})/2$$

$$\left\{ \begin{matrix} \bar{S}_{Y1} \\ \bar{S}_{Y2} \end{matrix} \right\} = \left[ \begin{matrix} \frac{H_{11} + H_{21}}{2} & \frac{H_{12} + H_{22}}{2} \\ \frac{H_{31} + H_{41}}{2} & \frac{H_{32} + H_{42}}{2} \end{matrix} \right] * \left\{ \begin{matrix} S_{X1} \\ S_{X2} \end{matrix} \right\}$$

$$= \left[ \begin{matrix} \bar{H}_{11} & \bar{H}_{12} \\ \bar{H}_{21} & \bar{H}_{22} \end{matrix} \right] * \left\{ \begin{matrix} S_{X1} \\ S_{Y2} \end{matrix} \right\} = \bar{H}_C S_{XX} = \left\{ \begin{matrix} T_1 \\ T_2 \end{matrix} \right\}$$

$$S_{TT_C} = a_T^2 \bar{H}_C^{-1} \left[ \begin{matrix} 1 & 1 \\ 1 & 1 \end{matrix} \right] (\bar{H}_C^{-1})', \text{ where } \det(\bar{H}_c) \neq 0.$$

Here, C refers to each combination. In addition, an error calculated as described above is as follows.

$$\left\| \bar{Q}(f) \right\|^2 = \left\| S_{TT}(f) - S_{RR}(f) \right\|^2 = \left\| S_{TT}(f) - H(f) S_{UU_c}(f) H(f)' \right\|^2$$

In addition, when the system has two input values and three output values, the number of possible combinations for three output values is three. For example, when there are three response points, the number of possible combinations of three response points is three (response points 1 and 2, and response point 3; response points 1 and 3, and response point 2; and response points 2 and 3, and response point 1). This may be expressed by the following equation.

$$\bar{S}_{Y1} = (S_{Y1} + S_{Y2})/2, \bar{S}_{Y2} = S_{Y3}$$

The remaining operations are the same as those performed in the case of four output values, and thus descriptions thereof will be omitted.

The controller 30 may reduce the dimension of a matrix by calculating an error for each combination as described above, and selecting a combination that results in the minimum error. For example, the controller 30 may calculate an error for each combination per predetermined frequency interval Δf throughout the entire frequency band. Then, the controller 30 may select a combination resulting in the minimum error at each predetermined frequency. Thus, at each predetermined frequency, the number of input values and the number of output values may each be two, and the vibration control device 1 may obtain a reduced 2*2 matrix.

Next, the controller 30 may perform multiple shaker control based on the matrix reduced as described above. For example, as shown in FIG. 3, the controller 30 inputs a calculated input value $S_{XXi}(f)$ to a plurality of shakers 20, and then the plurality of shakers 20 may vibrate the artificial satellite 10 at a frequency corresponding to the input value and may transmit information on the vibration of the artificial satellite 10 to the controller 30.

Next, the controller 30 may calculate a frequency response function using the input value and an obtained output value, and may then calculate an error from the input value and the output value. For example, the controller 30 may obtain an output value $S_{YYi}(f)$ resulting from the input value $S_{XXi}(f)$, and may calculate an error $E_i(f)=S_{TT}-S_{YYi}$.

Next, the controller 30 determines whether the error is within the preset second range. When the error is within the second range, feedback control is terminated, and when the error is outside the second range, the input value is corrected and input to the shakers 20 again.

For example, the controller 30 calculates a frequency response function $H_i(f)$ by dividing the output value $S_{YYi}(f)$ by the input value $S_{XXi}$. Then, as described above, the Moore-Penrose inverse matrix $G_i$ of the frequency response function $H_i(f)$ is calculated. Thereafter, the input value $S_{XXi}$ is corrected by $$S_{XX_{i+1}} = S_{XX_i} + G_i E_i(f) G_i'$$

and is input to the shakers 20 again, and then an output value $S_{YY_{i+1}}$ is calculated. Similarly, an error is calculated therefrom, and it is determined whether the error is within the second range, and feedback control is performed depending on results of the determination.

According to embodiments, in the vibration control device 1 including a plurality of shakers 20, an error is calculated by assuming the case of using one shaker 20, and based on whether the error is within the first range, it may be determined whether to perform single shaker control or multiple shaker control. Owing to this, the amount of calculation and time necessary for determining the type of feedback control to be performed may be reduced.

As frequency lowers, error caused by noise increases during calculation for multiple shaker control. According to embodiments, however, single shaker control is performed in a low frequency band, and thus error may be reduced.

As described above, according to the one or more of the above embodiments, in the vibration control device 1 including a plurality of shakers 20, error may be calculated for the case of using one shaker 20, and single shaker control or multiple shaker control may be selected based on results of determining whether the error is within the first range. Therefore, the amount of calculation and time necessary for determining the type of feedback control to be performed may be reduced.

In addition, during calculation for multiple shaker control, error caused by noise increases as frequency lowers. According to the embodiments, however, single shaker control is performed in a low frequency band, thereby reducing error.

In addition, according to the embodiments, inputs (driving signals) and outputs (responses) may be grouped into combinations each in which the number of inputs and the number of outputs are equal to each other, and multiple shaker control may be selectively performed for one of the combinations resulting in the minimum error, thereby reducing the dimension of a frequency response function.

While embodiments have been described with reference to the accompanying drawings, the embodiments are merely examples. It will be understood by those of ordinary skill in the art that various modifications and equivalent other embodiments may be made without departing from the spirit and scope of the present disclosure. The spirit and scope of the present disclosure should be defined by the following claims.

Specific techniques described in embodiments are merely examples and do not limit the technical scope of the embodiments. In order to concisely and clearly describe embodiments of the present disclosure, descriptions of general techniques and configurations of the related art may be omitted. Furthermore, line connections or connection members between elements depicted in the drawings represent functional connections and/or physical or circuit connections by way of example, and in actual applications, they may be replaced or embodied with various additional functional connections, physical connections, or circuit connections. In addition, elements described without using terms such as "essential" and "important" may not be necessary for constituting embodiments of the present disclosure.

An element referred to with the definite article or a demonstrative determiner may be construed as the element or the elements even though it has a singular form. Unless otherwise defined, the ranges defined herein are intended to include any embodiment to which values within the ranges are individually applied and may be considered to be the same as individual values constituting the ranges in the detailed description of the embodiments. Operations of a method may be performed in an appropriate order unless explicitly described in terms of order or described to the contrary. Operations of a method are not limited to the stated order thereof. In addition, examples or exemplary terms (for example, "such as" and "etc.") are used for the purpose of description and are not intended to limit the scope of the present disclosure unless defined by the claims. Also, those skilled in the art will readily appreciate that many alternations, combinations, and modifications may be made according to design conditions and factors within the scope of the appended claims and their equivalents.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A method of controlling vibration in an artificial satellite vibration test by using a controller and a plurality of shakers installed on an artificial satellite and configured to vibrate at a predetermined frequency, the method comprising:

providing the artificial satellite having the controller and the plurality of shakers for controlling vibration in the artificial satellite vibration test;

performing a pre-test operation in which the controller sets the artificial satellite as a system and calculates a plurality of input values using a frequency response function of the system and an inverse matrix of the frequency response function;

determining, by the controller, whether errors, which are differences between target values and a plurality of output values resulting from the plurality of input values, are within a first range; and performing, by the controller depending on results of the determination, single shaker control vibrating the artificial satellite using one of the plurality of shakers in a low frequency band, or multiple shaker control vibrating the artificial satellite using the plurality of shakers in different frequency bands, to effect feedback control, wherein the determining of whether the errors are within the first range comprises calculating errors at predetermined frequency intervals in an entire frequency band by using one of the plurality of shakers.

2. The method of claim 1, wherein when the errors are within the first range, the controller performs the single shaker control using one of the plurality of shakers.

3. A method of controlling vibration in an artificial satellite vibration test by using a controller and a plurality of shakers installed on an artificial satellite and configured to vibrate at a predetermined frequency, the method comprising:

providing the artificial satellite having the controller and the plurality of shakers for controlling vibration in the artificial satellite vibration test;

performing a pre-test operation in which the controller sets the artificial satellite as a system and calculates a plurality of input values using a frequency response function of the system and an inverse matrix of the frequency response function;

determining, by the controller, whether errors, which are differences between target values and a plurality of output values resulting from the plurality of input values, are within a first range; and performing, by the controller depending on results of the determination, single shaker control vibrating the artificial satellite using one of the plurality of shakers in a low frequency band, or multiple shaker control vibrating the artificial satellite using the plurality of shakers in different frequency bands, to effect feedback control;

wherein when the errors are outside the first range, the controller performs the multiple shaker control using the plurality of shakers, and wherein before performing the multiple shaker control, the controller reduces a dimension of the frequency response function by calculating errors for combinations of the plurality of output values per predetermined frequency interval and selecting one of the combinations resulting in a minimum error.

4. The method of claim 3, wherein the plurality of input values are two in number and the plurality of output values are three or four in number, and the controller reduces the dimension of the frequency response function by selecting three combinations of the plurality of output values per predetermined frequency interval, calculating an error for each of the combinations, and selecting one of the combinations resulting in a minimum error such that the frequency response function has two input values and two output values.

* * * * *